Patented Mar. 18, 1952

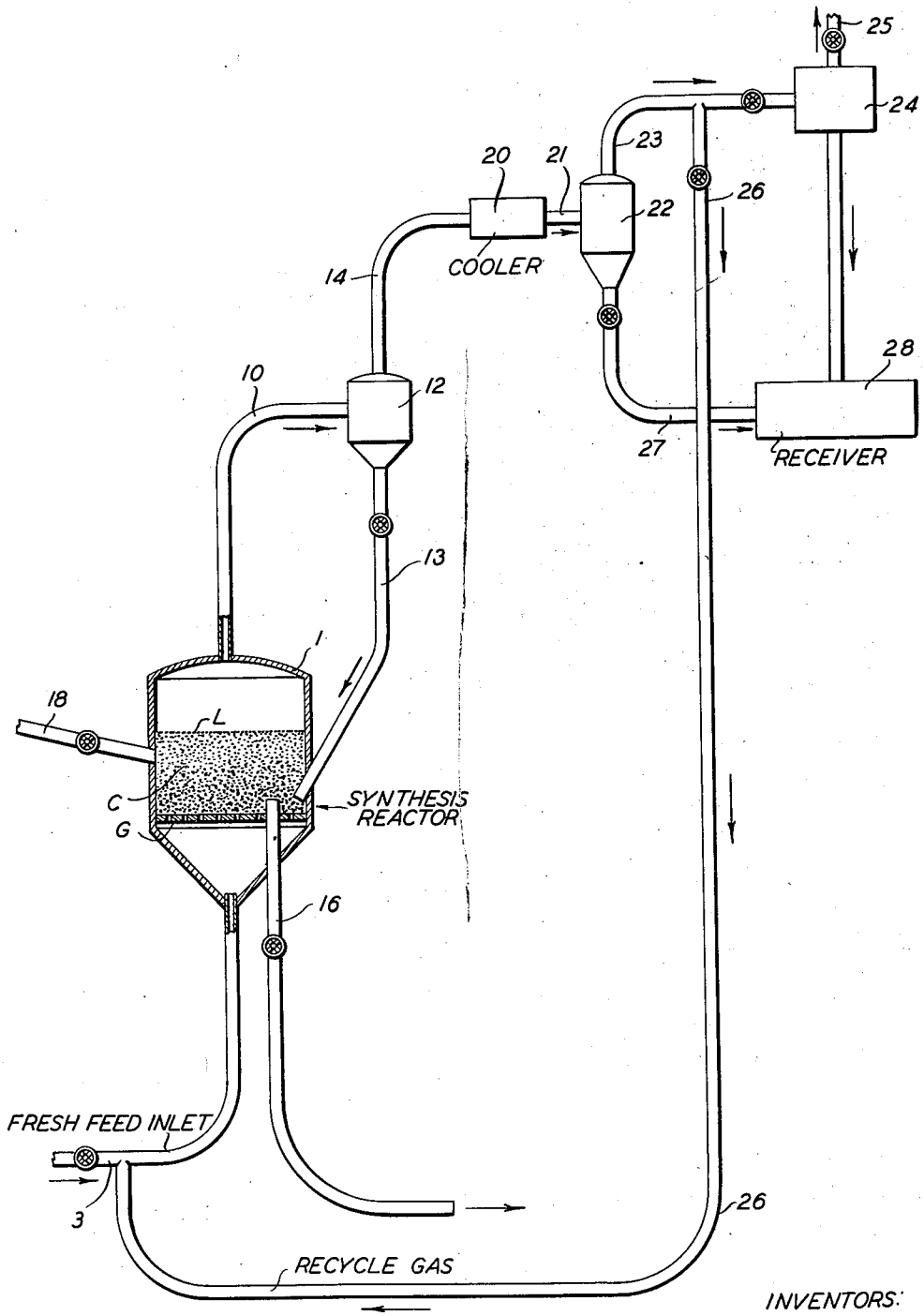

2,589,925

UNITED STATES PATENT OFFICE 2,589,925

HYDROCARBON SYNTHESIS

Virginia L. Cain, Linden, and Charles E. Hemminger, Westfield, N. J., assignors to Standard Oil Development Company, a corporation of Delaware Application May 9, 1947, Serial No. 747,112

3 Claims. (Cl. 260—449.6)

The present invention relates to improvements in the synthesis of hydrocarbons and oxygenated hydrocarbons by reacting carbon monoxide with hydrogen in the presence of a powdered iron catalyst in the form of a fluidized bed. More particularly, our present invention relates to improvements in the said synthesis wherein the formation of carbonaceous material on or in the catalyst is repressed.

The synthesis of hydrocarbons effected by reacting carbon monoxide and hydrogen in the presence of an iron catalyst is a matter of record, in the case where the iron catalyst is in the form of a stationary bed. A later development in this field was the employment of a powdered fluidized catalyst instead of a fixed or stationary bed of catalyst. The fluidized catalyst operation has many advantages over the fixed bed type of operation, for the former enables higher throughput and higher conversion than does the stationary bed type of operation for comparable quantities of catalyst. The reaction is highly exothermic, and in the stationary bed type of operation, in order to control temperatures, it is necessary to resort to extremely closely spaced cooling tubes, embedded within the mass of catalyst. In the fluid catalyst type of operation, on the other hand, because of its inherent character, wherein thorough mixing of all portions of the catalyst is attainable, the problem of cooling is not as difficult, and therefore, without danger of overheating, causing local hot spots, it is possible to operate the hydrocarbon synthesis process employing a fluidized bed of catalyst at high conversion levels and high temperatures, without degradation of the product.

The employment of a powdered iron catalyst in the form of a dense, turbulent, ebullient mass, commonly referred to as a fluidized bed, has, however, confronted the art with new problems. One of these problems is that, since the reaction usually results in the deposition of carbonaceous material in or on the powdered iron particles, the iron undergoes physical disintegration or deterioration. This is an undesirable result because it makes it difficult to maintain the iron in the form of a well-mixed fluidized mass if it contains a large quantity of iron particle fines, say a preponderance of particles having a size of from 0 to 20 microns. Experience has shown that a well-fluidized bed should have a preponderance of particles having a particle size greater than 20 microns, say 60% having a particle size of from 20 to 200 microns. But, as stated, our observation of the operation of a plant employing a fluidized bed of iron catalyst in hydrocarbon synthesis process has been that after a period of time, say 100–200 hours of operation, the carbonaceous deposits which form on the catalyst cause the physical disintegration of the latter with the result that it contains, as stated, an inordinately large quantity of fines, that is, material below 20 microns in size. Not only is it difficult to maintain the iron in the form of a well-fluidized, dense suspension when it contains such large quantities of fines but there is a further disadvantage that it is virtually impossible to recover any substantial amount of these fines and return them to the dense phase. It is difficult, if not impossible, to remove these fines from the vapors and return them to the bed, by means of centrifugal separators, electrical precipitators, filters and the like, and therefore the end result is that they pass through the recovery equipment and appear in the liquid product or condensate. Not only do the fines which pass overhead present a difficult problem in the recovery and purification system, but in the bed themselves when present in too great a quantity, they lower the heat transfer rate of the catalyst to the cooling surfaces and thus impair one of the important attributes of a fluidized bed.

We have now found that we may repress the rate of carbon formation on and in the catalyst and thus hinder or repress the tendency of the iron catalyst powder in a fluidized bed to undergo physical disintegration. Very briefly, our improvements involve preconditioning the catalyst and also maintaining a high hydrogen partial pressure in the reaction zone such that the tendency to form carbon is repressed and with it the tendency of the iron particles to deteriorate, all of which will more fully and at large appear hereinafter.

The object of the invention, therefore, is to carry out a hydrocarbon synthesis procedure employing powdered iron catalyst in the form of a dense, fluidized bed and to operate as to repress the formation of carbonaceous material.

Other and further objects of the invention will appear from the following more detailed description and claims.

In the accompanying drawing, we have shown diagrammatically the essentials of a plant in which a preferred modification of our invention may be carried into effect. In the drawing, I represents a reactor which is in the form of a cylinder having a conical base and a convex crownpiece. Disposed within the reactor is a foraminous member G. The feed, that is, the gases containing carbon monoxide and hydrogen, enter the reactor through line 3 and pass upwardly through the reactor which contains a body of powdered iron catalyst having a particle size of from 0 to 200 microns. While some latitude is permitted with respect to the particle size distribution, we have found that good results are obtained when the following typical particle size distribution exists:

Weight percent of 0–20 microns_____ 20
Weight percent of 20–40 microns_____ 30
Weight percent of 40–80 microns_____ 30
Weight percent of 80+ microns_____ 20

In order to maintain the iron in the form of a fluidized bed, it is necessary and desirable to cause the vapors to flow upwardly in said bed at a superficial velocity of from 0.25 to 2 feet per second, preferably, however, at a superficial velocity of about 0.7 foot per second. By "superficial velocity," we mean the velocity of the gas in the reactor containing no catalyst at the temperatures and pressures of the reactor.

The reactants pass upwardly through the bed of catalyst under conditions which will be described in detail hereinafter, and the desired conversion occurs. The product is withdrawn through a line 10 and discharged into a solids separating device 12 where entrained solids are removed and returned to the reactor through a line 13. The product substantially freed of entrained catalyst is withdrawn from the solids separator 12 through line 14 and passed through a cooler 20 wherein the product is cooled down to a temperature sufficiently low to condense water and a major portion of the hydrocarbons and then the total product is withdrawn from the cooler 20 through line 21 and discharged into a separation drum 22. From separation drum 22, the liquid product and water is withdrawn through line 27 and delivered to a recovery system 28. In this recovery system, the alcohols and other oxygenated hydrocarbons are separated from the gasoline, gas oil and other hydrocarbons according to known methods which do not go to the heart of this invention. A gaseous portion is withdrawn from separator 22 through line 23 which contains unconverted carbon monoxide and hydrogen, inert gas such as nitrogen, and light gaseous hydrocarbons and carbon dioxide. This material may be recycled through line 26 to line 3. Another portion of this gaseous material may, however, be discharged into an oil scrubber 24 and treated to recover hydrocarbons which are then delivered to the recovery system 28, while the undissolved gases are rejected from the system through line 25.

Referring again to the reactor, the fluidized bed of catalyst extends from G to an upper firm or well-defined dense phase level L, when the reactor is operated properly. Above the dense phase level L there is a dilute phase, that is to say, a region in which the catalyst is disengaged and separated from the vapors. It is feasible, therefore, to separate the major portion of the catalyst from the vapors within the reactor. When, however, there is carbon deposition on the catalyst, a physical breakdown of the said catalyst occurs and the level L expands, filling the reactor and even overflowing, and the density which should be of the order of about from 40 to 60 pounds drops to a value of 15 to 20 pounds per cubic foot when employing an iron type catalyst.

A feature of the invention is that, while carbon formation in or on the catalyst cannot be completely avoided without a serious decrease in yields of desired products, nevertheless it is possible according to the methods herein described to obtain good yields of desired products and at the same time to retard carbonaceous formation on or in the catalyst so that the formation of fines is delayed and replacement of catalyst is merely necessary at a reasonably low rate. But our invention includes withdrawing catalyst through a valved drawoff pipe 16 for reworking as by resintering in equipment not shown and thereafter reground and returned to the reactor through line 18.

The catalyst added to the reactor through line 18 is also preferably adjusted so as to be in an active form and of desirable chemical composition. For example, it should have an alkali content of from 0.2 to 0.8 weight per cent $K_2O$ on $Fe_2O_3$. The oxygen should be reduced by hydrogenation to less than 15%, a range of 5 to 10% being preferred.

The catalyst should contain from 1.0 to 3.5% by weight of "carbide" carbon. The carbide carbon is found mostly in the form of $Fe_2C$, and can best be formed by subjecting the catalyst to a pretreatment with a CO-rich gas in which the partial pressure of the CO is less than 100 pounds per square inch absolute, 25 to 75 pounds per square inch preferred, at temperatures of 100 to 300° F. below the hydrocarbon synthesis temperature, for a length of time to obtain the desired degree of carbide. This temperature will be from 300° to 400° F. This preconditioning of the catalyst with CO may be performed in the reactor prior to the synthesis reaction or in a separate vessel.

It is, of course, equally important that the optimum carbide carbon content of the catalyst be maintained in the reactor during the synthesis reaction. We have found that the carbide carbon content is sensitive to the hydrogen partial pressure in a reverse manner to the deposition of non-carbide carbon on the catalyst causing disintegration, that is, higher hydrogen partial pressures form more carbide carbon and less extraneous, fixed, or non-carbide carbon which latter causes catalyst disintegration. As illustrated below, when the hydrogen partial pressure is decreased below 150 pounds per square inch absolute for 650° F. operations, using a promoted and fluidized iron catalyst in the hydrocarbon synthesis, the carbide carbon content decreases below the desired amount of 1%.

| Hydrogen Partial Pressure | Carbide Carbon Weight Percent |
|---|---|
| 226 lbs. per sq. in. absolute | 2.5 |
| 170 lbs. per sq. in. absolute | 1.3 |
| 129 lbs. per sq. in. absolute | 0.9 |
| 74 lbs. per sq. in. absolute | 0.6 |

As previously indicated, the carbide carbon content should be maintained above 1% not only to decrease the formation of fixed carbon at the same hydrogen partial pressure but also to give good yields of liquid hydrocarbons. It has been found that increasing the carbide content from 1.3 to 2.3 weight per cent decreases the selectivity to carbon by 75% at the same hydrogen partial pressure and temperature. The following data also illustrate the effect of carbide carbon on liquid hydrocarbon yields for two typical hydrocarbon synthesis runs with other operating conditions being the same (e. g. temperature, fluidized iron catalysts, feed rates etc.)

| Weight Per Cent Carbide Carbon | Hydrogen Partial Pressure in lbs. per sq. in. absolute | Volume Per Cent Hydrogen in Total Feed | CC of $C_4+$ Per Cubic Meter of $H_2/CO$ Consumed |
|---|---|---|---|
| 2.3 | 185 | 45.1 | 174 |
| 1.6 | 194 | 46.9 | 154 |

By "fixed" carbon, we mean as indicated carbon formed on the catalyst in a form other than as iron carbide. This fixed carbon includes carbonaceous material extractable with a hydrocarbon solvent and, of course, non-extractable carbon.

As previously stated, the purpose of the present invention is to conduct a hydrocarbon synthesis operation under conditions wherein good yields of normally liquid product are obtained and at the same time the catalyst tendency to disintegrate is suppressed. It has been found that the hydrogen partial pressure of the gasiform material entering the reaction zone 1 through line 3 has an important effect on the rate of carbon deposition on the catalyst. This rate of carbon deposition cannot be prevented entirely, but it may be repressed to the extent that not more than ½ to 1 weight per cent of the carbon converted in the reactor to hydrocarbons and oxygenated hydrocarbons is converted to carbonaceous deposits in or on the catalyst. In this same connection, it has been found by us that the hydrogen partial pressure is responsive to the temperature conditions prevailing within the reaction zone, and in general it may be stated at this point that higher temperatures require higher partial pressures. To illustrate: increasing the temperature in the reaction zone 25°, at the same hydrogen partial pressure, doubles the rate of carbon formation. This means, of course, that at the higher temperatures the hydrogen partial pressure must be increased to avoid an undesirable rate of carbon formation. When operating in a range of 550° to 750° F., it is necessary to maintain partial pressure of hydrogen from at least 75 to 250 pounds per square inch and not greater than 500 pounds per square inch hydrogen partial pressure.

We now set forth below three specific examples illustrating our invention, and in all cases the catalyst, the temperature, the pressure and feed rate were as follows:

Catalyst [1]

Temperature in reaction zone __ 640° F.
Pressure in reaction zone _____ 400 p. s. i.
Fresh feed rate _____ 55 cu. ft. ($H_2$+ CO)/hr. lb. of catalyst

[1] The catalyst was a synthetic ammonia catalyst promoted with added potassium carbonate.

The following is a typical analysis of a freshly prepared catalyst:

| | |
|---|---|
| CuO | 0.09 |
| $SiO_2$ | 1.09 |
| Fe | 66.1 |
| Mn | 1.09 |
| $Al_2O_3$ | 2.45 |
| MgO | 0.09 |
| $O_2$ | 27.0 |
| NiO | 0.07 |
| $Cr_2O_3$ | 0.05 |
| $K_2O$ | 1.10 |

In these examples below, the hydrocarbon partial pressure was changed as follows: In case B, it was changed from case A by altering the ratio of hydrogen to carbon monoxide by adding hydrogen to the fresh feed but employing the same recycle rate of vent gases (line 26); and in case C, it was changed from case B by changing the recycle rate of the vent gases with the same fresh feed hydrogen to carbon monoxide ratio as in case B.

| Case | A | B | C |
|---|---|---|---|
| Fresh Feed—Volume Per Cent: | | | |
| $H_2$ | 69 | 62 | 64 |
| CO | 27 | 33 | 32 |
| $CO_2$ | 1 | 0 | 0 |
| Other gases | 3 | 5 | 4 |
| $H_2/CO$ | 2.5 | 1.9 | 2.0 |
| Recycle ratio | 2 | 2 | 6 |
| Total Feed—Per Cent: | | | |
| $H_2$ | 53 | 41 | 18 |
| CO | 10 | 13 | 6 |
| $CO_2$ | 1 | 11 | 10 |
| Other gases | 36 | 35 | 66 |
| Partial pressure of $H_2$, p. s. i. absolute | 220 | 170 | 74 |
| Carbon Formation, weight per cent CO converted to hydrocarbons and oxygenated materials | 0.07 | 0.14 | 1.3 |
| Liquid yield, cc. $C_4+/m^3$ of $H_2$ and CO consumed | 129 | 178 | 186 |

The foregoing data show that the hydrogen partial pressure at a given temperature and total pressure affects the rate at which carbonaceous depoists are formed in or on the catalyst. Thus, when the hydrogen partial pressure is 225 pounds per square inch, carbon was formed at the rate of 0.07% of the carbon monoxide converted to hydrocarbons and oxygenated hydrocarbons. When the hydrogen partial pressure was lowered to 170 pounds, this rate increased to 0.14 weight per cent. When, in case C, the hydrogen partial pressure was reduced to 74 pounds per square inch, this rate was 1.3%. There was little breakdown of the catalyst and expansion of the bed in the first two cases but in case C the expansion was considerable, about 30% in 140 hours of operation, a very undesirable condition. It is clear from the foregoing data, therefore, that at a temperature of around 640° F. the hydrogen partial pressure should be of the order of 170 pounds per square inch, for this procedure will cause the carbon formation to take a reasonably low rate and at the same time provide good yields of desired products.

We have found that yields of desired products are not markedly changed by raising the total pressure in the reactor to values as high as 1200 to 1500 pounds per square inch. As a result, the carbon formation may be controlled within desired limits with a given feed gas composition, recycle ratio and operating temperature. For commercial operation, a carbon formation rate of 0.5 weight percent of carbon monoxide converted to hydrocarbons and oxygenated hydrocarbons is practicable in that less than 40% of the 0 to 20 micron particles can be maintained in the reactor by adding less than about 10 weight per cent of catalyst in the reactor per day, this added catalyst being either new or reworked catalyst containing no material within the range of from 0 to 20 microns. The particle size and catalyst density in the reactor and fluidization in the reactor will remain constant for with only 0.5 weight per cent formation of carbon, the formation of 0-20 micron catalyst will be less than 10% of the catalyst per day. Since, however, high pressures are costly and tend to reduce liquid hydrocarbon yields, the minimum hydrogen partial pressure for several temperatures of operation are tabulated below as determined from a correlation of many pilot plant tests.

| Temperature | Hydrogen Partial Pressure |
|---|---|
| °F. | |
| 600 | 100 p. s. i. absolute. |
| 650 | 150 p. s. i. absolute. |
| 700 | 240 p. s. i. absolute. |

In general, it is desirable to operate at the highest temperature consistent with the operating pressure economically feasible. The higher temperature gives a higher conversion of feed gas to desirable products, greater olefinicity of the hydrocarbons, a greater gasoline content of the liquid hydrocarbons and a higher octane number of the gasoline before and after treating materials such as bauxite.

It is apparent to any one skilled in the art that the hydogen partial pressure may be varied by various devices or changes in the operation of the process. As previously indicated a higher total pressure for the same gas composition in the reactor will give a higher hydrogen partial pressure and less carbon formation. For a given total pressure, the hydrogen partial pressure may be altered by changing the gas composition. The percentage of hydrogen in the fresh feed may be increased for the same amount of carbon monoxide in the fresh feed. Decreases in the recycle ratio will increase the hydrogen partial pressure, because the hydrogen content of the recycle gas is less than that of the feed gas, due to the consumption of the hydrogen during the reaction and dilution of the hydrogen by carbon dioxide and light hydrocarbon gases. The addition of water to the reaction also increases the hydrogen partial pressure, because it suppresses the consumption of hydrogen in the reaction. Finally, removal of carbon dioxide from the fresh feed or the recycled vent gases will be effective in increasing the hydrogen partial pressure, because of the decreased dilution by the carbon dioxide and by the decreased reaction of hydrogen with the carbon dioxide during the reaction.

To summarize briefly, we have found that the hydrocarbon synthesis process may be improved substantially in the case where the operation is performed by causing hydrogen to reduce the oxides of carbon in the presence of a fluidized bed of powdered iron catalyst by manipulating the partial pressure of the hydrogen within fixed limits responsive primarily to the temperature prevailing in the reaction zone. When operating at temperatures within the range of from 575° F. to 750° F., which is the usual broad temperature range for this process, the hydrogen partial pressure of the gases in the reaction zone should be from 75 to 500 pounds per square inch, preferably from 100 to 250 pounds per square inch. And by preconditioning the catalyst either in the reactor prior to the productive phase, or the hydrocarbon synthesis reaction, or in a separate vessel, with pure CO or a gas rich in CO, we form iron carbide. The pretreatment is conducted at a relatively low temperature. This pretreatment in conjunction with a high hydrogen partial pressure maintained in the reaction zone during the synthesis results in the conversion of the powdered iron catalyst to an active form which is at the same time resistant to fragmentation of said catalyst during the hydrocrabon synthesis.

While we have described in detail a particular catalyst and given its composition, it is to be understood that other iron catalysts suitably promoted may be used. These catalysts include, for example, sintered pyrites ash, red iron oxide, iron produced from a so-called metallizing gun, and various other forms of iron. It is recognized that the disintegration of the catalyst with a given amount of carbon deposition on or in the catalyst depends to some degree on the physical strength of the catalyst particles and therefore the ranges of hydrogen partial pressure can be altered to some degree depending upon the particular type of catalyst employed.

We claim:
1. The method of synthesizing hydrocarbons and oxygenated hydrocarbons which comprises providing a fluidized bed of active powdered iron catalyst having a total oxygen content of about 5–10%, treating said powdered iron catalyst prior to contact with synthesis feed gas with a CO-rich gas in which the partial pressure of CO is about 25–75 lbs. per sq. in. absolute at temperatures within the range of from about 300°–400° F. for a sufficient period of time to convert the iron powder to iron carbide to the extent that it contains 1.0–3.5 weight percent of carbide carbon mostly in the form of $Fe_2C$ and thereafter contacting the thus treated catalyst in the form of a dense, fluidized bed in a reaction zone with a synthesis gas containing hydrogen and carbon monoxide while maintaing the reaction zone at temperatures of from about 550° F. to 700° F., maintaining a hydrogen partial pressure of about 170 lbs. per sq. in. the synthesis gas in said reaction zone whereby the above-mentioned carbide carbon content of the catalyst is maintained in the reaction zone during the synthesis reaction, maintaining the synthesis gas in contact with said catalyst in the reaction zone for a sufficient period of time to obtain the desired reaction, and recovering from said reaction zone effluent vapors containing normally liquid hydrocarbons.

2. The method of claim 1 in which the catalyst contains an alkali content of from about 0.2–0.8 weight percent $K_2O$ on $Fe_2O_3$ sufficient to promote formation of normally liquid hydrocarbons.

3. The method of claim 1 in which the iron powder catalyst contains alumina and an alkali content of from about 0.2–0.8 weight percent $K_2O$ on $Fe_2O_3$ sufficient to promote formation of normally liquid hydrocarbons.

VIRGINIA L. CAIN.
CHARLES E. HEMMINGER.

REFERENCES CITED

The following references are of record in the file of this patent:

UNITED STATES PATENTS

| Number | Name | Date |
|---|---|---|
| 1,148,570 | Bosch et al | Aug. 3, 1915 |
| 2,369,548 | Elian | Feb. 13, 1945 |
| 2,393,909 | Johnson | Jan. 29, 1946 |
| 2,409,235 | Atwell | Oct. 15, 1946 |
| 2,417,164 | Huber, Jr. | Mar. 11, 1946 |
| 2,445,796 | Millendorf | July 27, 1948 |